Sept. 3, 1929.    J. L. ANDERSON    1,726,940
PROTECTION OF GAS LINES
Filed March 5, 1925
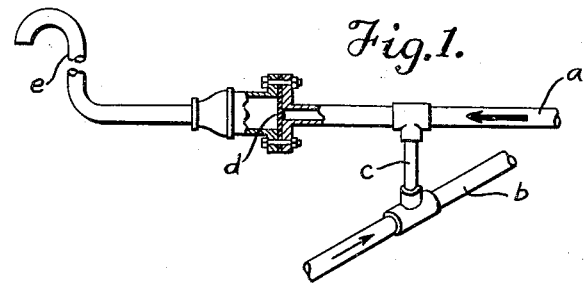
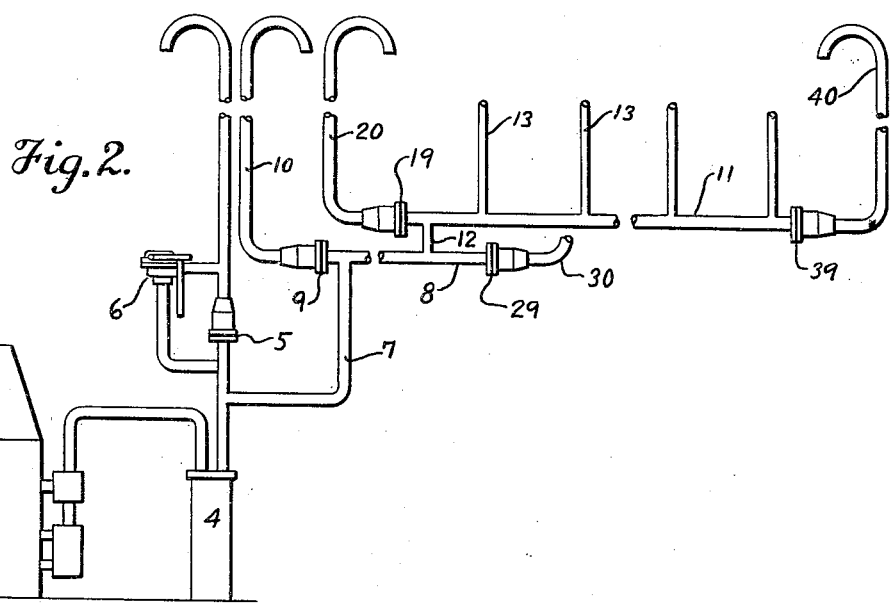
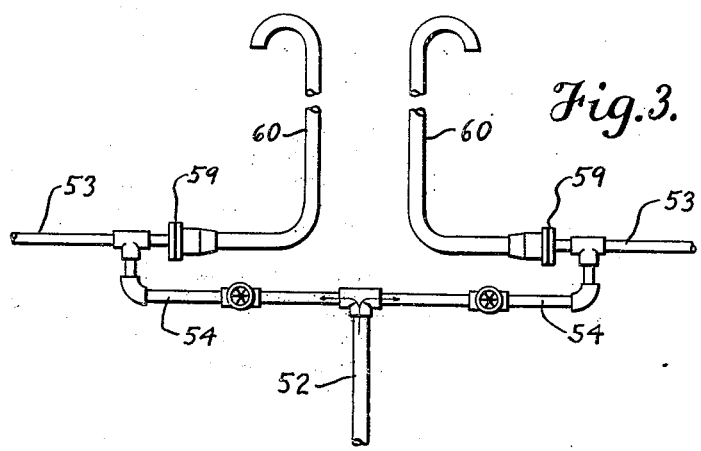
INVENTOR
James L. Anderson
BY
ATTORNEY Patented Sept. 3, 1929.

1,726,940

UNITED STATES PATENT OFFICE.

JAMES L. ANDERSON, OF ENGLEWOOD, NEW JERSEY, ASSIGNOR TO AIR REDUCTION COMPANY, INCORPORATED, OF NEW YORK, N. Y., A CORPORATION OF NEW YORK.

PROTECTION OF GAS LINES.

Application filed March 5, 1925. Serial No. 13,147.

The invention has for its object effectively to protect gas distribution systems in shops and elsewhere from explosions which are liable to occur occasionally in the use of gases such as acetylene, for example, employed for welding and cutting or for other purposes. Such explosions may injure apparatus connected with the system, or the operators, or cause damage to the building and its contents, and are particularly serious if they carry rearward so far as to involve the gas generator from which the system is supplied. These explosions, whether internal combustions or decompositions, result from various causes, not completely understood, and may act in various ways. With proper apparatus and installation they occur only very rarely, but absolute certainty of prevention should not be relied upon. This invention is based upon the conception that an explosion originating in any part of the system can be localized, deflected and rendered harmless. By localizing an explosion, the least amount of gas will be involved and the explosion will therefore be of small force, and if this explosion is at once exited to the outside atmosphere, all damage may be avoided, or the damage, if any, made very slight. I have ascertained that the force of an explosion acts principally in a direction counter to the flow of the gas current.

In the accompanying drawings illustrating the invention:

Fig. 1 is a perspective elevation with a portion in section and a portion broken out, showing a junction between two lines or sections of a piping system embodying the invention with a bursting disk and a vent associated therewith;

Fig. 2 is a schematic elevational view of a system shown on a smaller scale, with portions broken away and broken out; and Fig. 3 is an elevation of another junction designed after the invention, portions of the vent pipes being broken out.

Fig. 1 illustrates a typical construction at a junction between lines of piping which will be repeated throughout a system. In this view $a$ is one gas distribution line, and $b$ is another line through which the line $a$ receives gas from the acetylene generator. The light arrow represents the direction of flow of gas, and the heavy arrow on the pipe $a$ indicates the counter direction of an explosion that might occur in line $a$. The purpose is to restrict and minimize such an explosion, and to keep it from going back to the generator. The lines $a$ and $b$, which are represented as two-inch piping, are connected by a relatively narrow, short pipe or nipple $c$, marked as of one and a half inch size. This connecting pipe joins the pipe $a$ a short distance in advance of its rear end, at right angles; and the cul-de-sac at the rear end of pipe $a$ is closed by a bursting disc $d$ disposed in the direct line of action of an explosion wave proceeding rearwardly along the line of piping $a$. Connected at the opposite side of the bursting disc is an open vent pipe $e$ of ample area, which is carried out through the wall or roof of the building. The bursting disc, suitably clamped between flanges, holds against all ordinary pressures, but yields immediately to the force of an explosion traveling straight rearward in pipe $a$, the normally closed vent being thus operative to evacuate the excess pressure and flame out of the system and to keep it from reaching the line $b$ and other parts of the system, extending rearward to the generator. The explosion shoots across the mouth of the supplying or connecting pipe $c$ arranged at an angle to the pipe $a$; and I find that a short nipple of moderately reduced area will pass all the gas required for service that would ordinarily be supplied through a line of the size of $b$, while further guarding this line from the effect of a disturbance arising at a point ahead in the system. The effect of a rearwardly-closing check-valve in the gas passage is secured without the disadvantages and uncertainties of such a device and indeed a check-valve can not always be relied upon to close quickly enough to prevent an explosion passing it.

The pipes $b$ and $a$ may be regarded as a supply line and a distributing line, main and sub-main, main and branch, or simply as subdivisions or sections of the gas distribution system.

For further illustration, a simple system is shown in Fig. 2, 3 being the acetylene generator, and 4 a water-seal connected with the generator and provided with a double-path explosion vent containing a bursting disc 5 in the direct path to outside atmosphere and a spring-loaded valve 6 in indirect path, as disclosed in my Patent No. 1,677,225, dated July 17, 1928. Piping 7 connects the outlet gas chamber of the water-seal with a line 8, the piping 7 entering the line 8 at an angle, and the straight rear-end projection of the line 8 being equipped with a bursting disc 9 and a vent pipe 10, as described in connection with Fig. 1. The line 8 extends for a considerable distance, and is connected with a line 11 by a reduced nipple 12 at right angles, as in Fig. 1. The line 11 has the characteristically arranged, normally closed, emergency disc 19 and vent 20 at its rear end, just back of the gas entrance from the nipple 12. Small branches 13 taken off from the line 11 lead to welding stations or the like.

The lines or sections 8 and 11 are also provided with vents of the construction and arrangement described at their forward ends, these discs and vents being marked 29 and 30 and 39 and 40 respectively. Maximum protection is secured when the system is thus divided into sections, connected with each other in the manner described, and having the emergency offtake vents at both ends, each section being a straight line of pipe closed at its opposite ends by bursting discs.

Where a line would otherwise be of undue length, it may be split up into two or more sections, which are supplied with gas from a common main at their adjacent ends. This is illustrated in Fig. 3, where 52 is a two-inch pipe connected with the generator, and 53, 53, are inch and a half distribution lines or sections, the direction of flow of the gas being indicated by the light arrows. The supplying main 52 is connected with the lines 53 by short angled branches 54, 54, of inch and a half piping, and the rear ends of the lines 53 are shown provided with the vents, which are marked 59, 60.

Certain illustrative constructions have been described in order that there may be a clear understanding of the invention, but it will be understood that the invention is not limited to the precise arrangement or proportions. It will be understood that distribution systems protected in the manner described may be used with combustible gases other than acetylene, such as methane, butane, butylene, propylene, etc.

I claim:

1. In a distribution system for combustible gas, in which explosions may occur, the combination of a gas distribution line, a line through which gas is led to the aforementioned line, a relatively narrow, short connecting pipe between said lines joining said distribution line at an angle, and an explosion vent at the rear end of said distribution line behind the inlet from said connecting pipe, with a yielding closure at this point disposed in the direct line of action of an explosion wave proceeding rearwardly along said distribution line to vent the explosion outside the system.

2. In a distribution system for combustible gas, in which explosions may occur, the combination of a gas distribution line, a line through which gas is led to the aforementioned line, a relatively narrow, short connecting pipe between said lines joining said distribution line at an angle, and an explosion vent at the rear end of said distribution line behind the inlet from said connecting pipe, with a bursting disc at this point disposed in the direct line of action of an explosion wave proceeding rearwardly along said distribution line to vent the explosion outside the system.

3. In a distribution system for combustible gas, in which explosions may occur, the combination of a plurality of gas distribution line sections having their rear or inlet ends adjacent each other, a common line with branches through which gas is led into the aforementioned distribution line sections at an angle, said branches comprising narrow, short connecting pipes, and explosion vents at the rear ends of said distribution line sections behind the inlets from said connecting pipes, with bursting disks at these points disposed in the direct lines of action of explosion waves proceeding rearwardly along said distribution line sections to vent the explosion outside the system.

4. In a distribution system for combustible gas, in which explosions may occur, the combination with a gas distribution line, and another line connected with a source of gas from which other line the aforementioned distribution line is supplied, of a relatively narrow, short connecting pipe joining the aforementioned distribution line at an angle, said distribution line having a straight rear-end extension, a closure at the end of said extension adapted to open to the force of an explosion wave proceeding directly rearward along said distribution line to vent the explosion outside the system, and an open vent pipe extending from the other side of said closure.

5. In a gas distribution system for combustible gases, in which explosions may occur, a gas distribution line, a pipe or line through which said distribution line is supplied, said supplying line joining said distribution line at an angle adjacent its rear end, and an explosion vent on the rear end of said distribution line normally closed by a bursting disc which is disposed in the direct line of action of an explosion wave proceeding rearwardly along said distribution line to vent the explosion outside the system.

6. In a gas distribution system for combustible gases in which explosions may occur, a straight section of gas distribution line, a supplying pipe joining said section of distribution line at an angle, and explosion vents at the opposite ends of said straight section normally closed by bursting discs disposed directly across the line to vent explosions outside the system.

JAMES L. ANDERSON.